Dec. 15, 1936.    L. C. SHIPPY    2,064,085
ARC WELDER
Filed April 4, 1932    6 Sheets-Sheet 6
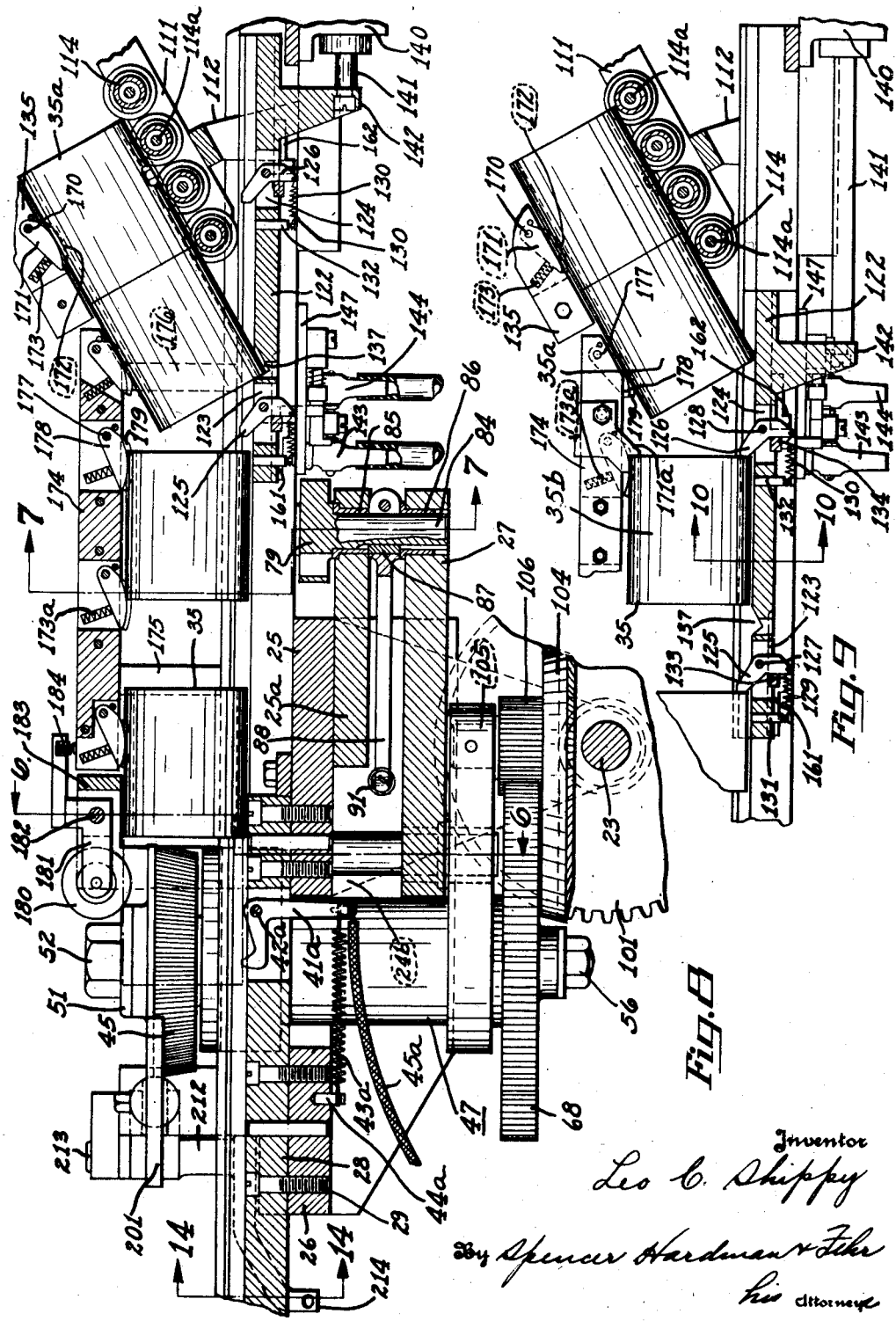
Inventor
Leo C. Shippy
By Spencer Hardman & Fihr
his Attorneys Patented Dec. 15, 1936

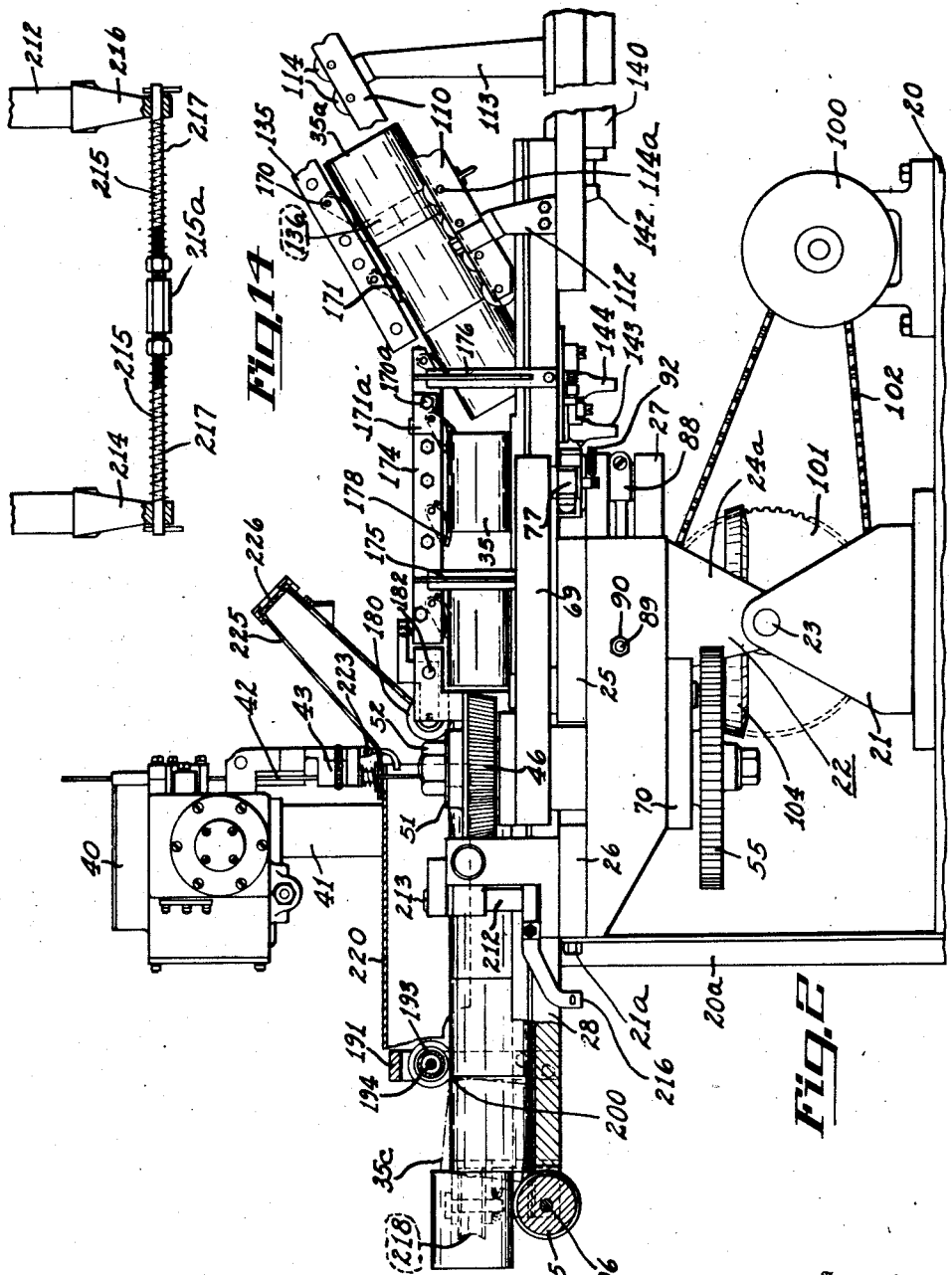

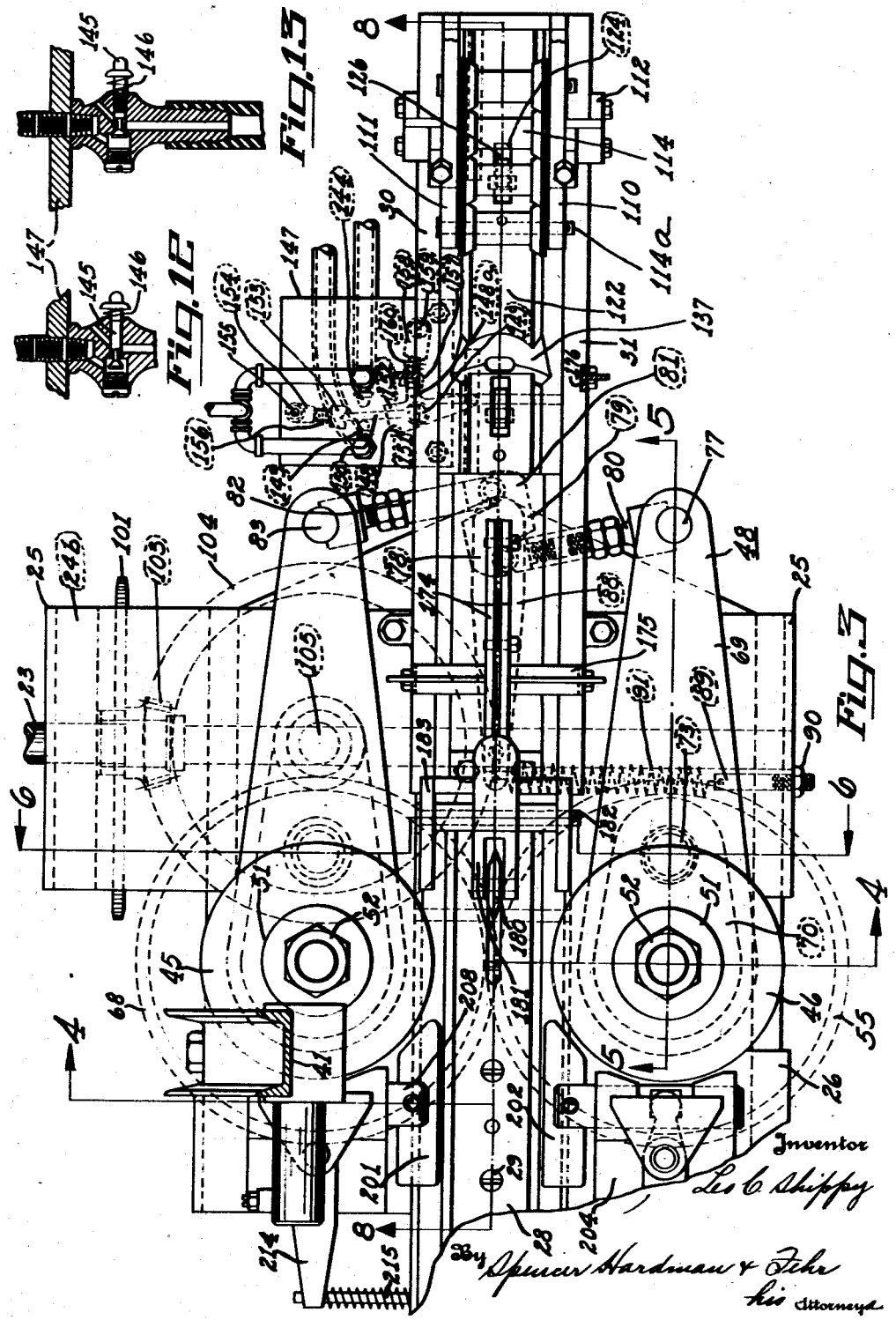

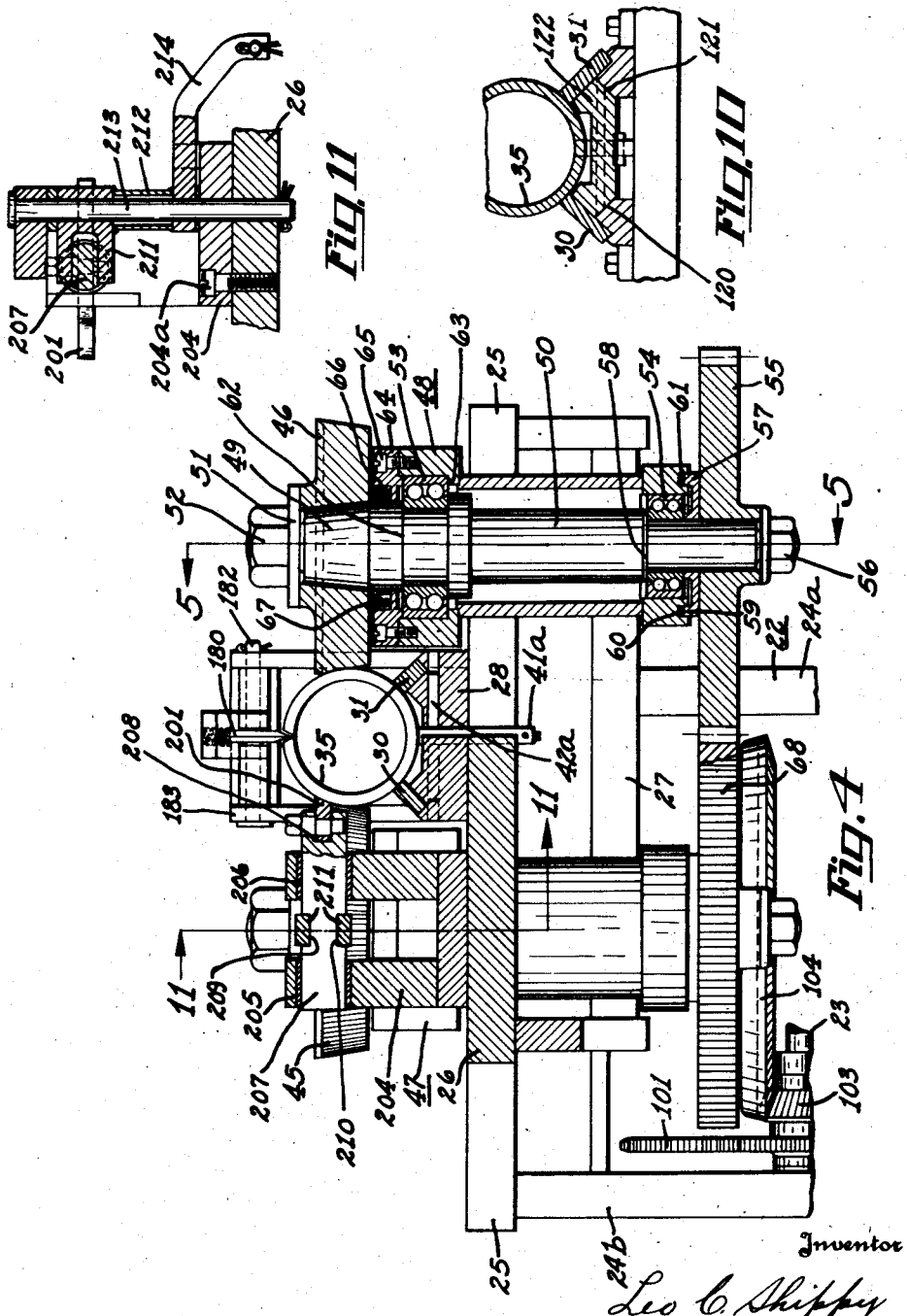

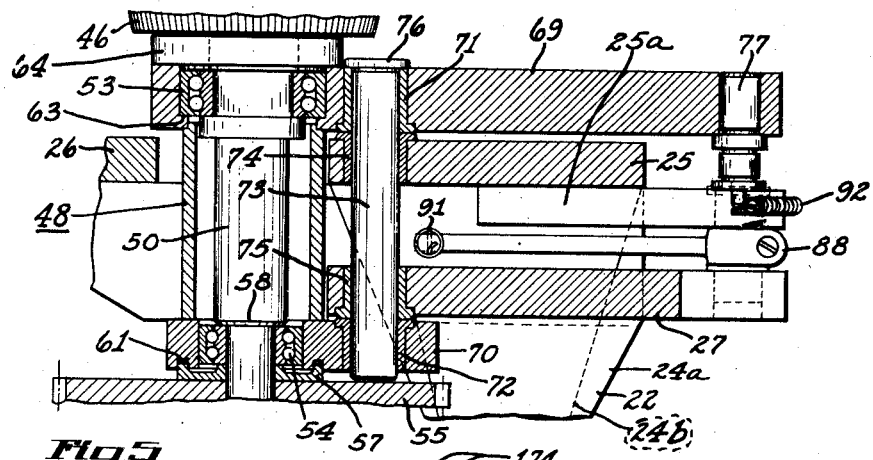
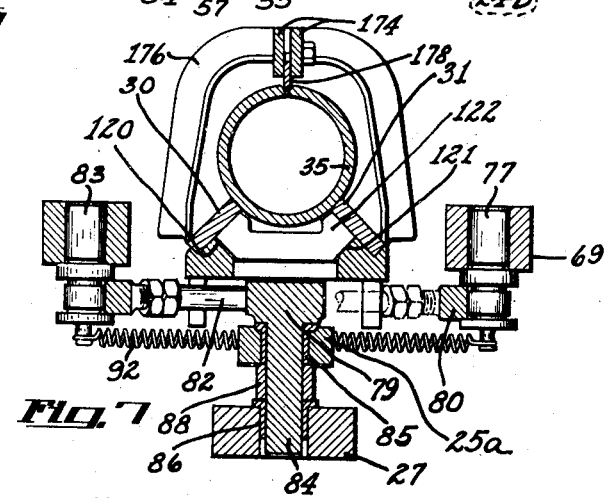
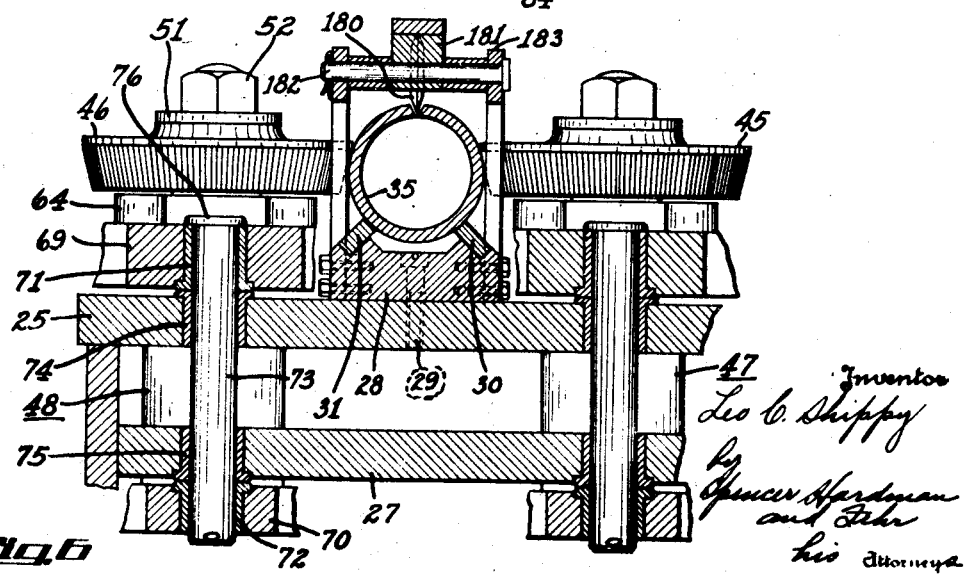

2,064,085

UNITED STATES PATENT OFFICE 2,064,085

ARC WELDER

Leo C. Shippy, Anderson, Ind., assignor, by mesne assignments, to General Motors Corporation, Detroit, Mich., a corporation of Delaware Application April 4, 1932, Serial No. 602,948

23 Claims. (Cl. 219—6)

This invention relates to a machine for welding and particularly metal arc welding tubular workpieces, such as generator field frames.

It is among the objects of the present invention to provide a machine which successively and automatically feeds workpieces past the electrode.

Another object of the present invention is to provide means for maintaining the welding seam of the pieces in alignment with the electrode.

Another object of the present invention is to provide means for automatically breaking the joint formed by welding material between the welded seams of adjoining workpieces.

Further objects and advantages of the present invention will be apparent from the following description, reference being had to the accompanying drawings wherein a preferred embodiment of one form of the present invention is clearly shown.

In the drawings:

Fig. 2 is a front elevation of the machine.

Fig. 3 is an enlarged fragmentary top view of the machine, having certain parts removed for better disclosure of certain other important parts.

Fig. 4 is sectional view taken on the line 4—4 of Fig. 3.

Fig. 5 is a fragmentary sectional view taken on the line 5—5 of Figs. 3 and 4.

Fig. 6 is a fragmentary sectional view taken substantially on the line 6—6 of Figs. 3 and 8.

Figs. 7 is a sectional view taken on the line 7—7 of Fig. 8.

Fig. 8 is a sectional view taken on the line 8—8 of Fig. 3.

Fig. 9 is a fragmentary sectional view similar to a part of Fig. 8 and illustrates together with Fig. 5 the manner in which a workpiece is transferred from a chute onto a horizontal conveyor.

Fig. 10 is a sectional view taken along the line 10—10 of Fig. 9.

Fig. 11 is a fragmentary sectional view taken on the line 11—11 of Fig. 4.

Fig. 12 is a fragmentary sectional view through a Powell blow gun in open position, used in connection with the conveyor moving means.

Fig. 13 is a sectional view through the same blow gun in closed position, however.

Fig. 14 is an enlarged sectional view taken on the line 14—14 of Fig. 8.

Figure 1:
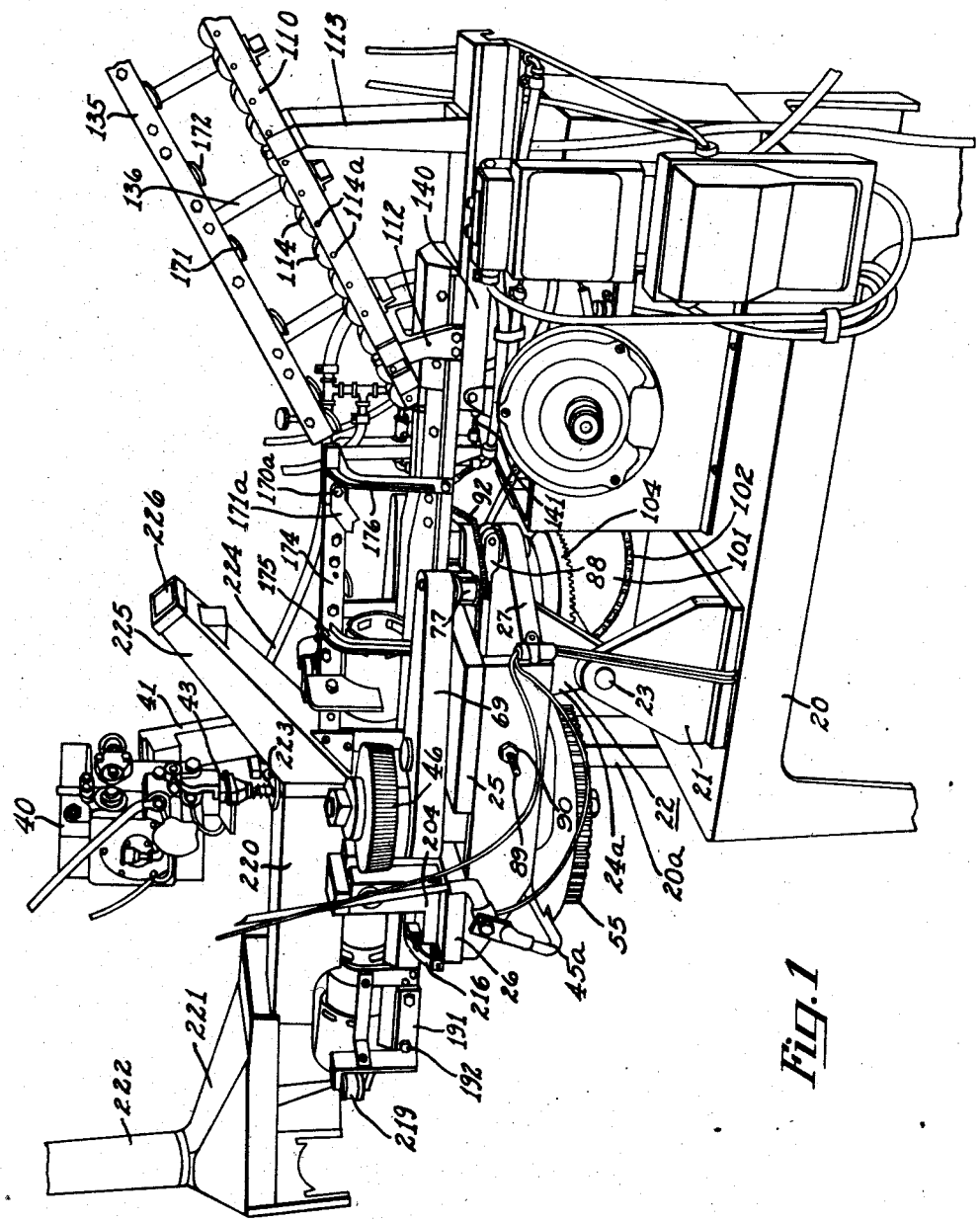
Fig. 1 is a perspective view of a machine embodying the present invention.

Referring to the drawings and particularly to Figs. 1 and 3 a table 20 is shown supporting a bracket 21, carrying a shaft 23 on which another bracket 22 is journaled. The bracket 22 comprises two parallel legs 24a and 24b, and three horizontal plates 25, 26 and 27 as best shown in Fig. 4. The bracket 22 is held non-rotatable on the shaft 23 by an angle 20a which ties said bracket to the table 20 by being secured to both by screws 21a. A support plate 28, resting on the plates 25 and 26 of the bracket 22 and secured thereto by screws 29, carries a track consisting of parallel guide rails 30 and 31 which extend over part of said support plate and are adapted to support and guide tubular workpieces 35 for horizontal movement in one direction as best disclosed in Fig. 6.

Arc welder head

Referring particularly to Figs. 1 and 2, any well known arc welding head 40 such as the Goodspeed type welding head, for instance, is supported by a U-shaped bar 41 which is secured to support 22 in any suitable manner. An electrode 42 of suitable welding composition is fed by the welding head vertically toward or away from the welding seam of a workpiece 35 in such manner that the arc gap between the end of the electrode and the welding seam remains substantially uniform. Any suitable source of electric power (not shown) is transmitted to the electrode by a sliding contact member 43. As best shown in Fig. 8 a conductive lever 41a, pivoted to the support plate 28 as at 42a is urged into engagement with a workpiece 35 which is adjacent the end of the electrode 42 by a spring 43a, secured to a pin 44a let in the plate 26 of bracket 22. A conductor 45a connects said lever with either the ground or the negative side of the electric power source. No further description of the arc welding head and its control is deemed necessary because they are well known to those skilled in the art and because they do not form part of my invention.

Device for feeding a workpiece past the electrode

Referring now to Figs. 4 and 6, two rotary wheels 45 and 46 are shown engaging the periphery of a workpiece 35 for moving the latter over the guide rails 30 and 31 and past the electrode 40 which is in alignment with the welding seam of the workpiece. Both of these wheels are rotatably supported in bodily movable brackets 47 and 48, only one of which will be described detailedly for the sake of brevity, it being understood that the non-described bracket comprises exactly the same elements and is operated in the same manner.

The wheel 46 is drawn into firm engagement with a conical end 49 of a stub shaft 50 by a washer 51 and a nut 52 which is threadedly received by a reduced portion of said shaft. The shaft 50 is journaled in annular ball bearings 53 and 54 located in the bracket 48. The other end of shaft 50 which extends beyond ball bearing 54 has a gear wheel 55 splined thereto which is held against longitudinal movement relative to the shaft by a nut 56, received by a threaded portion of said shaft end, which nut draws the gear wheel 55, a washer 57 and ball bearing 54 into firm engagement with a shoulder 58 of shaft 50. The washer 57 provides an annular rim 59 which snugly fits into an annular groove 60 of bracket 48 and bears against packing material 61 in said groove, thereby preventing welding sparks and other undesirable foreign substance from entering into ball bearing 54 and also preventing longitudinal movement of shaft 50 relative to bracket 48 in one direction. Another shoulder 62 of shaft 50 rests on ball bearing 53, which in turn rests on a shoulder 63 provided by the bracket 48, thereby preventing longitudinal movement of the shaft relative to the bracket in the other direction. A cover plate 64 is secured to the bracket 48 by screws 65 and maintains ball bearing 53 in engagement with the shoulder 63 of said bracket. This cover plate also provides an annular recess 66 containing a packing 67 which prevents welding sparks and other foreign substance from entering into ball bearing 53. The gear wheel 55 is continuously in mesh with another gear wheel 68 which is carried by a shaft in bracket 47 which is the same as shaft 50. As best shown in Fig. 5, bracket 48 comprises a long arm 69 and a short arm 70, both of which pressfittedly receive vertically aligned bushings 71 and 72, journaled upon a stud 73 which in turn is journaled in vertically aligned bushings 74 and 75, pressfitted into the plates 26 and 27 of bracket 22. Bushing 71 which carries the entire weight of the bracket 48 rests against the bushing 74 in plate 26, which therefore has to take up the entire weight of the bracket. The stud 73 comprises a head 76 which rests on bushing 71 and prevents longitudinal movement of said stud toward the rotary gear wheel 55. As best shown in Figs. 3, 5 and 8, the long arm 69 of bracket 48 carries a stud 77 which is connected with one arm 78 of a lever 79 by a lengthwise adjustable connecting rod 80. The opposite arm 81 of said lever is connected by another connecting rod 82 with a stud carried by the long arm of bracket 47. The lever 79 itself provides a cylindrical portion 84, journaled in vertically aligned bushings 85 and 86 of an extension 26a on the plate 26, and plate 27 respectively, of bracket 22, and has keyed thereto at 87 intermediate the bushings 85 and 86 a rod 88, which free end is connected by a spring 91 with a stud 89, secured to bracket 22 by a nut 90. The spring 91 tends to rotate rod 88 and therewith lever 79 counterclockwise as viewed in Fig. 3, the connecting rod 80 will thereupon rotate the bracket 48 clockwise about shaft 73, while connecting rod 82 will rotate bracket 47 counterclockwise. Both ends of a comparatively weak spring 92 are secured to the studs 77 and 83 on the long arms of brackets 48 and 47, respectively, which is adapted to hold the connecting rods 80 and 82 in engagement with arms 78 and 81 respectively of lever 79 and the studs 77, 83, respectively. From all this follows that the feeding wheels 45 and 46 are yieldingly urged into engagement with the periphery of the workpiece 35 and that they follow slight irregularities in the periphery or in the diameter of a workpiece. It also appears from Figs. 4 and 6 that the beveled serrated peripheries of the feeding wheels 45 and 46 have a tendency to maintain the workpiece in engagement with the guide rails 30 and 31 on the support.

As best shown in Fig. 2, a motor 100 is drivingly connected by a chain 102 with a sprocket wheel 101, which is rotatable on the shaft 23. Integral with the sprocket wheel and coaxial thereof is a bevel pinion 103, (see Fig. 3) which is in mesh with a large bevel gear 104, rotatably supported on a stub shaft 105 which is mounted in the short arm of bracket 47 as best shown in Fig. 8. Integral with the bevel gear 104 and coaxial thereof is a pinion 106 which is in mesh with the gear 68 of bracket 47. It will be readily understood from the foregoing that the motor 100 drives gear 68 through the intermediation of chain 102, sprocket wheel 101, bevel pinion 103, bevel gear 104 and pinion 106. Gear 55 of bracket 48 which is in constant mesh with gear 68 is driven by the latter gear in an opposed direction of rotation and rotates at the same speed as gear 68 due to the ratio 1 to 1 between said gears. Slight rocking in either direction of the bracket 47 which carries bevel gear 104 does not demesh the bevel gear and its cooperating bevel pinion due to the great ratio between said bevel gear and pinion, neither does slight rocking of both brackets 47 and 48 in either direction demesh gear wheels 68 and 55 due to the considerable depth of the teeth on these gear wheels.

*Chute for stored workpieces*

Referring to Figs. 1, 2, 3, 8 and 9 two parallel bars 110 and 111 are held in spaced parallel relationship and suitably inclined toward the support plate 28 by brackets 112 and 113 which are mounted on said support plate. Rotatably supported on equally spaced rods 114a, connecting the bars 110 and 111, are concave rollers 114 which are adapted to support and guide a plurality of stored workpieces toward a horizontal conveyor or carriage.

*Horizontal conveyor for workpieces*

Movable longitudinally of the guide plate 28 on the beveled surfaces 120 and 121 thereof is a conveyor 122 as best shown in Figs. 3, 8, 9 and 10. This conveyor which does not engage a workpiece overlying on the guide rails 30 and 31, provides two recesses 123 and 124, each of which receives a dog 125 and 126, respectively, both of which are pivoted at 127 and 128, respectively, to the conveyor. Both of these dogs 125 and 126 are urged by springs 129 and 130, respectively, secured to pins 131 and 132 in the conveyor, into engagement with stops 133 and 134, respectively, provided by the conveyor. In the position of the dogs disclosed in Figs. 8 and 9 they project over the top surface of the conveyor and upon movement of the same toward the left as viewed in Fig. 9, and upon engagement with workpieces move the same toward the left on the guide rails 30 and 31. Upon movement of the conveyor toward the right, the dogs are forced to dodge a workpiece resting on the guide rails 30, 31 which urges the dogs to rotate counterclockwise against the tension of the springs 129 and 130 and disappear in the recesses 123 and 124, thus clearing the resting workpiece. It can be readily understood that the lowermost workpiece 35a in the chute rests on the conveyor 122 instead of on the guide rails 30 and 31 due to its inclined position with respect to these guide rails, but the workpiece 35a is still guided for movement in one direction in the chute by a pair of rails 135, overhanging the stored workpieces in the chute and held in such position by bracket arms 136 which are secured to the bar 111 in any suitable manner. The conveyor 122 provides a depression 137 intermediate the dogs 125 and 126 into which the lowermost workpiece 35a will descend when moved underneath said workpiece as shown in Fig. 8, which position of the conveyor represents a right end position as may be stated in advance. Upon movement of the conveyor toward the left the workpiece 35a will be carried by the conveyor a slight distance, sufficient to remove the workpiece from the chute, which then drops onto the guide rails 30 and 31. Upon continued movement of the conveyor toward the left, the dog 126 will engage the workpiece 35a and move it along the rails 30 and 31 into an intermediate position 35b, while concurrently therewith the other dog 125 moves another workpiece from the intermediate position into gripping engagement with the feeding wheels 45 and 46. The position of the conveyor 122 as disclosed in Fig. 9 is a left end position. During the movement of the conveyor toward the right, the dog 125 will dodge the workpiece in the intermediate position 35b in the described manner while dog 126 will dodge the new lowermost workpiece in the chute. The conveyor comes to rest when the depression 137 moves underneath the now lowermost workpiece in the chute, ready to allow the same to drop onto the guide rails 30 and 31 upon another movement of the conveyor toward the left and to slide the workpiece into intermediate position and another workpiece from intermediate position into gripping engagement with the feeding wheels.

Control of movement of conveyor

Referring now to Figs. 2, 8 and 9 a cylinder 140 on the bottom side of the support plate 28 and integral therewith receives a piston (not shown) which is connected by a piston rod 141 with a lug 142 of the conveyor 122. Both sides of the cylinder are connected by suitable means such as pipes and hoses with a source of compressed fluid (not shown), preferably compressed air. Intermediate the source of compressed air and both sides of the cylinder are two Powell blow guns 143 and 144 which are normally intercepting communication between the source of compressed air and the cylinder. No detailed description of the Powell blow gun will be had because it is well known to those skilled in the art. It will be sufficient to say that upon depressing of the valve stem 145 of either blow gun against the tension of a spring 146, communication between the source of compressed air and either cylinder side is restored, depending upon the particular blow gun which is being opened. Both Powell blow guns are secured in any suitable manner to a plate 147 which is fastened to the bottom side of the support plate 28 in any suitable manner. As best shown in Fig. 3, a lever 148 is pivoted on a stud 149 which is secured to the plate 147, a rod 150 is pivoted also on the stud 149 and engageable with either of two stops 151 and 152 of the lever 148. A yoke 153 is axially slidably received by a small block 154 which is pivoted at 155 to the plate 147 and more particularly on a point of the aligned axes of rod 150 and said yoke. A spring 156 urges the yoke into engagement with the free end of rod 150. The spring pressed yoke has a tendency to shift rod 150 into firm engagement with either valve stem of the blow guns and press the rod against the same. The lever 148 also provides a right-angularly extending arm 148a which is engaged by a yoke 157, axially slidably received by another small block 158 which is also pivoted as at 159 to the plate 147 and more particularly on a point of the axis of the yoke 157 when aligned with arm 148a of lever 148. A spring 160 urges yoke 157 into engagement with arm 148a. The spring pressed yoke 157 has a tendency to shift the lever 148 in two directions from a position wherein its arm 148 is aligned with the axis of yoke 157. The conveyor 122 carries two lugs 161 and 162 as best shown in Fig. 8, which are lengthwise adjustable with respect to the conveyor. The rod 150 is located intermediate these lugs and projects into their path of movement. It will be supposed that the conveyor moves toward the left from the position shown in Fig. 8 to that shown in Fig. 9. During such movement of the conveyor the lug 162 will approach the lever 148 which is then in the position shown in Fig. 8 and finally engage and shift said lever against the tension of the spring urged yoke 157 into a position in which the lever arm 148a and the axis of said yoke are in alignment. After the lever has passed this position the yoke 157 forces said lever to advance with respect to the lug 162 which is still moving. During this advanced movement of the lever 148 its shoulder or stop 151 engages the rod which is still in the position shown in Fig. 8 and moves the same into a position where the rod and the yoke 153 are in alignment. Thereafter no force from the lever is required to shift the rod into engagement with the valve stem of the blow gun on the right as viewed in Fig. 8. The lever 148 will naturally follow the rod and the combined tendency of the spring urged yokes will result in depressing of the valve stem in this blow gun. Movement of the conveyor toward the left will immediately cease and the conveyor will start to move toward the right as can be readily understood. During the movement of the conveyor toward the right the lug 161 will shift the lever 148 in the described manner which results in closing of the blow gun on the right and opening of the blow gun on the left and therefore a reversal in movement of the conveyor. The lugs are naturally so adjusted that the reversals of the direction of movement of the conveyor take place in the previously described end-positions of the conveyor.

Welding seam guide means

Pivoted intermediate the rails 135 as at 170 in Figs. 2, 8 and 9 are a plurality of guide shoes 171 which have a beveled edge 172 with which to ride in the welding seam of the workpieces in the chute. A spring 173 located intermediate these rails in aligned grooves thereof urges each guide shoe with its beveled edge into the welding seam of a workpiece. Thus when the operator places a new workpiece into the chute he has to turn the same until the beveled edge of the nearest guide shoe snaps into the welding seam. The guide shoes are so distant from each other that at least one shoe rides in the welding seam of a workpiece under all circumstances. Overhanging the conveyor 122 is a pair of spaced rails 174 secured to standards 175 and 176 mounted on the support plate 28 in any suitable manner. Pivoted at 177 intermediate these rails are a plurality of guide shoes 178 which are the same as 171 and which beveled edges 179 are urged by springs 173a into the welding seam of a workpiece while being conveyed horizontally. The guide shoe 178 closest to the rails 135 follows the seam of a descending lowermost workpiece in the chute while being transferred from the chute to the conveyor thus preventing rotation of the workpiece about its own axis even when this workpiece drops from a considerably inclined position onto the guide rails 30 and 31. To offer the feeding wheel the least possible resistance, guide shoes are only applied as long as a workpiece is not gripped by the feeding wheels. A roller 180 is rotatable on a bracket 181 which is pivoted at 182 to a standard 183, mounted on the support plate 28 in any suitable manner. A spring 184, resting against the rails 174 urges the bracket 181 to rotate counterclockwise as viewed in Fig. 8, so that the beveled peripheral edge of the roller is urged to roll in the welding seam of a workpiece which is being fed by the feeding wheels 45, 46, thereby maintaining the welding seam of said workpiece in alignment with the electrode 42.

Pivoted at 170a to the rails 174 is a pawl 171a which prevents a workpiece 35b in intermediate position from following the conveyor 122 when moving toward the right as viewed in Figs. 8 and 9. This case may arise when one of the dogs 125 or 126 would for some reason not dodge in the explained manner.

Breaker of welded joint between consecutive workpieces

Referring more particularly to Figs. 1 and 2, a frame 191 is secured to the support plate 28 by screws 192. A concave roller 193 is journaled on a rod 194, which is carried by said frame. Another concave roller 195 is journaled on a rod 196 also carried by said frame, and projects considerably above the lowermost portion of a workpiece resting on the guide rails 30 and 31. This concave roller 195 raises a moving workpiece from these guide rails, while the concave roller 193 holds the next following workpiece onto the guide rails. The roller 195 causes the foremost end of the workpiece 35c, shown in dot and dash lines in Fig. 2, to raise from the guide rails first while the rearmost end is rocked about the welded joint 200 between the welding seams of two consecutive workpieces. The workpieces follow each other so closely that the weld is usually continued over the joint between successive workpieces so that they are in fact welded together. Such rocking movement of the workpiece 35c relative to the next following workpiece causes a break in the welded joint between the welding seams of these two workpieces. In order that the welded workpieces do not rotate while being pushed by a fed workpiece from the feeding wheels past the rollers 193 and 195, two guide shoes 201 and 202 are yieldingly urged into engagement with the welded workpieces intermediate the feeding wheels 45, 46 and the roller 193. These two guide shoes create enough friction to prevent rotation of these workpieces. Since both guide shoes and their operating mechanism are exactly alike, only one will be detailedly described, it being understood that like parts may be referred to under like reference numerals. As best shown in Figs. 4 and 11, a bracket 204 mounted on the plate 26 of bracket 22 by screws 204a provides horizontally aligned bushings 205 and 206 which slidably receive a cylindrical bar 207, having one end forked for pivotally receiving the guide shoe 201 as at 208. This cylindrical bar 207 provides two opposite and aligned notches 209 and 210 in its periphery which receive the forked arm 211 of a lever 212, journaled on a rod 213 which is supported by the bracket 204. Arms 214 and 216 of the levers 212 slidably support axially aligned bars 215, which bars are adjustably connected with each other by an interiorly threaded sleeve 215a. Springs 217 surrounding bars 215 intermediate the arms 214 and 216 urge these arms apart so that the guide shoes 201 and 202 are yieldingly urged into engagement with a workpiece. Should, in spite of the guide shoes 201 and 202, some of the welded workpieces rotate about their own axis, so that the welded joint between consecutive workpieces deviates from the position shown in Fig. 2, the raised workpiece 35c would then have a tendency to roll off the concave roll 195 as can be readily understood. In order to prevent this, two rolls 218 and 219 are supported for rotation about a vertical axis by the frame 191 which guide the workpiece 35c in the direction of movement of the remaining workpieces. The finally separated workpieces may fall on any suitable conveying means or may be removed by hand.

Safety device

A channel-like guard 220 is placed over the welded workpieces and the one being welded, and is adapted to lead the gases and sparks resulting from the welding process to a chimney 221 which is in communication with any suitable suction means (not shown), by a piping 222. As shown in Figs. 1 and 2 a plurality of jets 223 are communicating through a rubber hose 224 with the supply of compressed air and lead streams of compressed air in the direction toward the chimney without interfering with the welding arc, thereby directing the flow of the gases and sparks. The guard 220 provides an inclined portion 225 which open end is closed by a window 226 through which the operator may look and insure himself of the proper welding process taking place.

Mode of operation

One after the other of the workpieces in the chute is transferred onto the horizontal guide rails 30 and 31, conveyed by the dog 126 of the conveyor into an intermediate position, while concurrently therewith another workpiece is being conveyed into gripping engagement with the feeding wheels 45 and 46 by another dog 125 of the continuously reciprocating conveyor 122 in the earlier explained manner. When a workpiece is being fed by the feeding wheels, it closes the welding circuit immediately after its welding seam moves into alignment with the electrode 42. The reason for using a fluid pressure actuated piston for reciprocating the conveyor resides in the advantage that the carriage is able to yield when the foremost workpiece moved over the guide rails by the foremost dog on the carriage engages a workpiece which is still fed by the feeding wheels at a uniform speed. The carriage whose yielding force does not overcome the gripping engagement of the feeding wheels which the workpiece just being fed therefore maintains said foremost workpiece in engagement with the fed workpiece until the carriage reaches foremost position at which time the mentioned foremost workpiece is already in feeding engagement with the feeding wheels. In this manner consecutive workpieces when passing the electrode are always abutting each other and the welding arc is not interrupted, which, however, will result in a welding together of adjoining workpieces on adjoining welding seams. The row of these weld-joined workpieces is continuously pushed forward by a fed workpiece toward the joint breaking rollers 193 and 195 which separate the foremost workpiece from the next following in the earlier described manner.

While the form of embodiment of the present

What is claimed is as follows:

1. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; means for moving the lowermost workpiece in the chute over the track and into engagement with the feeding device; and means for maintaining the welding seams of the workpieces in the chute in proper alignment with the electrode.

2. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; means for moving the lowermost workpiece in the chute over the track and into engagement with the feeding device; and means for maintaining the welding seams of the workpieces in proper alignment with the electrode during their travel through the chute upon the track and thereover until they pass the electrode.

3. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; a reciprocable carriage permitting the lowermost workpiece in the chute to drop upon the track during one reciprocation of said carriage, said carriage having dogs for moving a workpiece on the track into engagement with the feeding device; other power means for reciprocating said carriage; means for rendering said other power means effective; and means for maintaining the welding seams of the workpieces in proper alignment with the electrode during their travel through the chute upon the track and thereover until they pass the electrode.

4. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; fluid pressure operated means for moving the carriage toward the electrode; means for supplying fluid pressure; a valve normally intercepting communication between the fluid pressure operated means and the fluid pressure supplying means; means for opening the valve; means for moving the carriage away from the electrode and means for maintaining the welding seams of the workpieces in proper alignment with the electrode during their travel through the chute upon the track and thereover until they pass the electrode.

5. In an arc welding machine the combination of, an axially movable electrode of welding composition; a horizontal track for supporting a workpiece and for guiding the same into position for welding; an inclined chute containing the cylindrical workpieces in end-to-end order; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double acting piston for reciprocating the carriage; means for supplying fluid pressure to either side of the cylinder; normally closed valves intercepting communication between the fluid pressure supplying means and both sides of the cylinder; shiftable means yieldingly opening either valve upon engagement with the same and maintaining the valve open during such engagement; means for shifting the valve opening means from engagement with one valve into engagement with the other valve; and means for maintaining the welding seams of the workpieces in proper alignment with the electrode during their travel through the chute upon the track and thereover until they pass the electrode.

6. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double acting piston for reciprocating the carriage; means for supplying fluid pressure to either side of the cylinder; normally closed valves intercepting communication between the fluid pressure supplying means and both sides of the cylinder; shiftable means yieldingly opening either valve upon engagement with the same and maintaining the valve open during such engagement; means for shifting the valve opening means from engagement with one valve into engagement with the other valve in response to movement of the carriage in one direction; means for shifting the valve opening means from engagement with said other valve into engagement with said one valve; and means for maintaining the welding seams of the workpieces in proper alignment with the electrode during their travel through the chute upon the track and thereover until they pass the electrode.

7. In an arc welding machine the combination of, an axially movable electrode of welding composition; a horizontal track for supporting a workpiece and for guiding the same into position for welding; an inclined chute containing cylindrical workpieces in end-to-end order; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double-acting piston for reciprocating the carriage; means for supplying fluid pressure to both sides of the cylinder; normally closed valves intercepting communication between the fluid pressure supplying means and both sides of the cylinder; shiftable means yieldingly opening either valve upon engagement with the same and maintaining the valve open during such engagement; means for shifting the valve opening means from engagement with one valve into engagement with the other valve in response to movement of the carriage in one direction; means for shifting the valve opening means from engagement with said other valve into engagement with said one valve in response to movement of the carriage in the opposite direction; and means for maintaining the welding seams of the workpieces in proper alignment with the electrode during their travel through the chute upon the track and thereover until they pass the electrode.

8. In an arc welding machine the combination of, an axially movable electrode of welding composition, an inclined chute containing cylindrical workpieces in end-to-end order; a horizontal track for supporting a workpiece and for guiding the same into position for welding; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double acting piston for reciprocating the carriage; means for supplying fluid pressure to both sides of the cylinder; normally closed valves intercepting communication between the fluid pressure supplying means and both sides of the cylinder; a pivotally mounted rod being shiftable into engagement with either valve for opening the same and extending between both valves; a yoke receiving the end of the rod and being pivoted at a point where the rod when out of engagement with either valve is in axial alignment with the yoke, said yoke being spring-urged toward the rod so that upon movement of the latter out of axial alignment with the yoke, the same will urge the rod into engagement with a valve; means for shifting the rod from engagement with one valve beyond axial alignment with the yoke whereupon the rod is urged into engagement with the other valve by the yoke; and means for maintaining the welding seams of the workpieces in proper alignment with the electrode during their travel through the chute upon the track and thereover until they pass the electrode.

9. In an arc welding machine the combination of, an axially movable electrode of welding composition, an inclined chute containing cylindrical workpieces in end-to-end order; a horizontal track for supporting a workpiece and for guiding the same into position for welding; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double acting piston for reciprocating the carriage; means for supplying fluid pressure to both sides of the cylinder; normally closed valves intercepting communication between the fluid pressure supplying means and both sides of the cylinder; a pivotally mounted rod extending between both valves and adapted to open the latter upon engagement with the same; a first yoke receiving the end of the rod and being pivoted at a point where the rod when out of engagement with either valve is in axial alignment with the yoke, said yoke being spring urged toward the rod so that upon movement of the latter out of axial alignment with the yoke, the same will urge the rod into engagement with a valve; a lever being pivoted for rotation about the same axis as the rod and having two spaced shoulders between which the rod extends and an extending arm; a second yoke receiving the arm of the lever, said second yoke being spring urged and pivoted at such a point that upon shifting of the lever beyond axial alignment of the lever arm with the second yoke, the latter urges the lever to continue its rotation whereby a shoulder of the lever engages the rod which is in engagement with a valve and shifts it beyond axial alignment with the first yoke whereupon both yokes cooperate to shift the rod into engagement with the other valve and maintain the same in such engagement; means for shifting the lever; and means for maintaining the welding seams of the workpieces in proper alignment with the electrode during their travel through the chute upon the track and thereover until they pass the electrode.

10. In an arc welding machine the combination of, an axially movable electrode of welding composition, an inclined chute containing cylindrical workpieces in end-to-end order; a horizontal track for supporting a workpiece and for guiding the same into position for welding; a device adjacent the electrode for feeding a workpiece on the track past the electrode; power means for actuating the feeding device; a reciprocable carriage permitting the lowermost workpiece in the chute to drop upon the track during one reciprocation thereof, said carriage having dogs for moving a workpiece on the track into engagement with the feeding device; a cylinder containing a double acting piston for reciprocating the carriage; means for supplying fluid pressure to both sides of the cylinder; normally closed valves intercepting communication between the fluid pressure supplying means and both sides of the cylinder; a pivotally mounted rod extending between both valves and adapted to open the latter upon engagement with the same; a first yoke receiving the end of the rod and being pivoted at a point where the rod when out of engagement with either valve is in axial alignment with the yoke, said yoke being spring urged toward the rod so that upon movement of the latter out of axial alignment with the yoke, the same will urge the rod into engagement with a valve; a lever being pivoted for rotation about the same axis as the rod and having two spaced shoulders between which the rod extends and an extending arm; a second yoke receiving the arm of the lever, said second yoke being spring urged and pivoted at such a point that upon shifting of the lever beyond axial alignment of the lever arm with the second yoke, the latter urges the lever to continue its rotation whereby a shoulder of the lever engages the rod which is in engagement with a valve and shifts it beyond axial alignment with the first yoke whereupon both yokes cooperate to shift the rod into engagement with the other valve and maintain the same in such engagement; adjustable lugs on the carriage for shifting the lever toward the end of each forward and backward movement respectively, of the carriage; and means for maintaining the welding seams of the workpieces in proper alignment with the electrode during their travel through the chute upon the track and thereover until they pass the electrode.

11. In an arc welding machine the combination of, an axially movable electrode of welding composition; a horizontal track for supporting a workpiece and for guiding the same into position for welding; parallel stub shafts on opposite sides of the electrode; brackets journaled upon said stub shafts; feeding wheels rotatably supported by said brackets remote from the stub shafts and having serrated peripheries with which to grip a workpiece on the track from opposite sides; gears rotatable with the feeding wheels and meshing with each other; a driving gear rotatably supported by one of the brackets and meshing with the gear which is rotatable with the feeding wheel supported by said one bracket; a prime mover; a permanent driving connection between the prime mover and the driving gear; means normally yieldingly rotating each bracket about its stub shaft in a direction to engage each feeding wheel with the periphery of the workpiece on the track; an inclined chute containing cylindrical workpieces; means for transferring the lowermost workpiece in the chute upon the track and for moving said workpiece over the track and into engagement with the feeding wheels; and means for maintaining the welding seams of the workpieces in proper alignment with the electrode during their travel through the chute upon the track and thereon until they pass the electrode.

12. In an arc welding machine the combination of, an axially movable electrode of welding composition; a horizontal track for supporting a workpiece and for guiding the same into position for welding; parallel stub shafts on opposite sides of the electrode; brackets journaled upon said stub shafts, each bracket having an extending arm; feeding wheels rotatably supported by said brackets remote from the stub shafts and having serrated peripheries with which to grip the workpiece on the track from opposite sides; gears rotatable with the feeding wheels and meshing with each other; a driving gear rotatably supported by one of the brackets and meshing with the gear which is rotatable with the feeding wheel supported by said one bracket; a prime mover; a permanent driving connection between the prime mover and the driving gear; a pivotally mounted lever located intermediate the arms of the brackets; a pair of links each connecting an end of the lever with an arm of one of the brackets; yielding means permanently urging the lever to rotate in a direction so as to effect rotation of the brackets in such direction that the feeding wheels engage a workpiece on the track; an inclined chute containing cylindrical workpieces; means for transferring the lowermost workpiece in the chute upon the track and for moving said workpiece over the track and into engagement with the feeding wheels; and means for maintaining the welding seams of the workpieces in proper alignment with the electrode during their travel through the chute upon the track and thereover until they pass the electrode.

13. In an arc welding machine the combination of, an axially movable electrode of welding composition; a track for supporting cylindrical workpieces and for guiding the same into position for welding; a device adjacent the electrode for feeding a workpiece on the track past the electrode; power means for actuating the feeding device; means for moving the workpieces on the track into engagement with the feeding device; a stationary bar; a plurality of guide chutes carried by said bar and being yieldingly urged toward the workpieces on the track, each of said guide chutes having a beveled edge with which to ride in the welding seams of the workpieces whereby they are kept in proper alignment with the electrode; and a roller having a beveled peripheral edge with which to roll in the welding seam of a workpiece while being fed past the electrode.

14. In an arc welding machine the combination of, an axially movable electrode of welding composition; a horizontal track for supporting workpieces and for guiding the same into position for welding; an inclined chute containing cylindrical workpieces; a device adjacent the electrode for feeding a workpiece on the track past the electrode; power means for actuating the feeding device; means for transferring the lowermost workpiece in the chute upon the track and for moving said workpiece over the track and into engagement with the feeding device; stationary bars; a plurality of guide shoes carried by said bars and being yieldingly urged toward the workpieces in the chute and on the track, said guide shoes having beveled edges with which to ride in the welding seams of the workpieces during their travel through the chute upon the track and over the latter into engagement with the feeding device whereby the welding seams of these workpieces are kept in proper alignment with the electrode; and a roller having a beveled peripheral edge with which to roll in the welding seam of a workpiece while being fed past the electrode.

15. A welding machine comprising welding means, means for feeding a plurality of articles in firm end-to-end engagement with their seams in alignment with said welding means, means for positively closing the seams in said articles at the point of welding, and means for separating said articles after the welding operation has been performed by bending and breaking the weld between said articles.

16. A welding machine comprising a conveyor upon which the articles to be welded are supported, means for feeding said articles in end-to-end engagement past a welding agency, and means for separating said articles after the welding operation has been completed by bending and breaking the seam between said articles.

17. Welding apparatus comprising means engaging the work on opposite sides of the seam to be welded for exerting a seam closing pressure on the work, means for feeding the work with the seam in a predetermined position relative to a welding means, and means for moving said work engaging members toward and away from one another equal amounts to center the seam relative to said welding means.

18. In an arc welding machine the combination of, an axially movable electrode of welding composition; a track for supporting workpieces and for guiding the same into position for welding; a device adjacent the electrode for feeding a workpiece on the track past the electrode; power means for actuating the feeding device; means for moving successive workpieces on the track into engagement with the feeding device in such manner that successive workpieces fed past the electrode abut each other; means for maintaining the welding seams of the workpieces on the track in proper alignment with the electrode; a roller engaging the second foremost welded workpiece and holding the same onto the track; and means projecting above the track so as to rock the foremost welded workpiece substantially about the welded joint between the welded seams of these two workpieces, thereby breaking said welded joint.

19. In an arc welding machine the combination of, an axially movable electrode of welding composition; a track for supporting workpieces and for guiding the same into position for welding; a device adjacent the electrode for feeding a workpiece on the track past the electrode; power means for actuating the feeding device; means for moving successive workpieces on the track into engagement with the feeding device in such manner that successive workpieces fed past the electrode abut each other; means for maintaining the welding seams of the workpieces on the track in proper alignment with the electrode; and means carried by the track for rocking the foremost welded workpiece about the welding joint between welding seams of said foremost workpiece and the next following welded workpiece, thereby breaking said welding joint.

20. In an arc welding machine the combination of, an axially movable electrode of welding composition; a track for supporting workpieces and for guiding the same into position for welding; a device adjacent the electrode for feeding a workpiece on the track past the electrode; power means for actuating the feeding device; means for moving successive workpieces on the track into engagement with the feeding device in such manner that successive workpieces fed past the electrode abut each other; means for maintaining the welding seams of the workpieces on the track in proper alignment with the electrode; a roller engaging the second foremost welded workpiece and holding the same onto the track; and another roller projecting above the track so as to rock the foremost welded workpiece substantially about the welding joint between the welding seams of these two workpieces, thereby breaking said welding joint.

21. In an arc welding machine the combination of, an axially movable electrode of welding composition; a horizontal track for supporting work pieces and for guiding the same into position for welding; a device adjacent the electrode for feeding a workpiece on the track past the electrode; power means for actuating the feeding device; a horizontally reciprocable carriage having a depression; dogs on said carriage yieldingly projecting above the latter so as positively to engage a work-piece on the track only when the carriage moves towards the feeding device; and an inclined chute containing workpieces, said chute being so located relative to the carriage that the lowermost workpiece therein rests against the movable carriage but is held laterally immovable by the chute until the depression of the carriage moves underneath said lowermost workpiece during movement of the carriage away from the electrode, said lowermost workpiece when resting in the depression of the carriage being caused to drop upon the track upon movement of the carriage toward the electrode whereupon a dog of the carriage engages said workpiece and moves it over the track toward the feeding device.

22. In an arc welding machine the combination of, an axially movable electrode of welding composition; a horizontal track for supporting workpieces and for guiding the same into position for welding; a device adjacent the electrode for feeding a workpiece on the track past the electrode; power means for actuating the feeding device; a horizontally reciprocable carriage having a depression; dogs on said carriage yieldingly projecting above the latter so as positively to engage a workpiece on the track only when the carriage moves towards the feeding device; and an inclined chute containing workpieces in end-to-end order, said chute being so located relative to the carriage that the lowermost workpiece therein rests against the movable carriage but is held laterally immovable by the chute until the depression of the carriage moves underneath said lowermost workpiece during movement of the carriage away from the electrode, said lowermost workpiece when resting in the depression of the carriage being caused to drop upon the track upon movement of the carriage toward the electrode whereupon a dog of the carriage engages said workpiece and moves it over the track toward the feeding device.

23. In an arc welding machine the combination of, an axially movable electrode of welding composition; a track for supporting workpieces and for guiding the same into position for welding; a device adjacent the electrode for feeding a workpiece on the track past the electrode; power means for actuating the feeding device; a horizontally reciprocable carriage having a depression; dogs on said carriage yieldingly projecting above the latter so as positively to engage a workpiece on the track only when the carriage moves towards the feeding device; an inclined chute containing workpieces, said chute being so located relative to the carriage that the lowermost workpiece therein rests against the movable carriage but is held laterally immovable by the chute until the depression of the carriage moves underneath said lowermost workpiece during movement of the carriage away from the electrode, said lowermost workpiece when resting in the depression of the carriage being caused to drop upon the track upon movement of the carriage toward the electrode whereupon a dog of the carriage engages said workpiece and moves it over the track toward the feeding device, a second power means for reciprocating the carriage; means actuated in response to movement of the carriage toward the electrode for causing said second power means to reverse the direction of movement of the carriage after a predetermined movement of the same toward the electrode; and means actuated in response to movement of the carriage away from the electrode for causing the second power means to reverse the direction of movement of said carriage when the depression thereof has moved underneath the lowermost workpiece in the chute.

LEO C. SHIPPY.